United States Patent Office 3,495,585
Patented Feb. 17, 1970

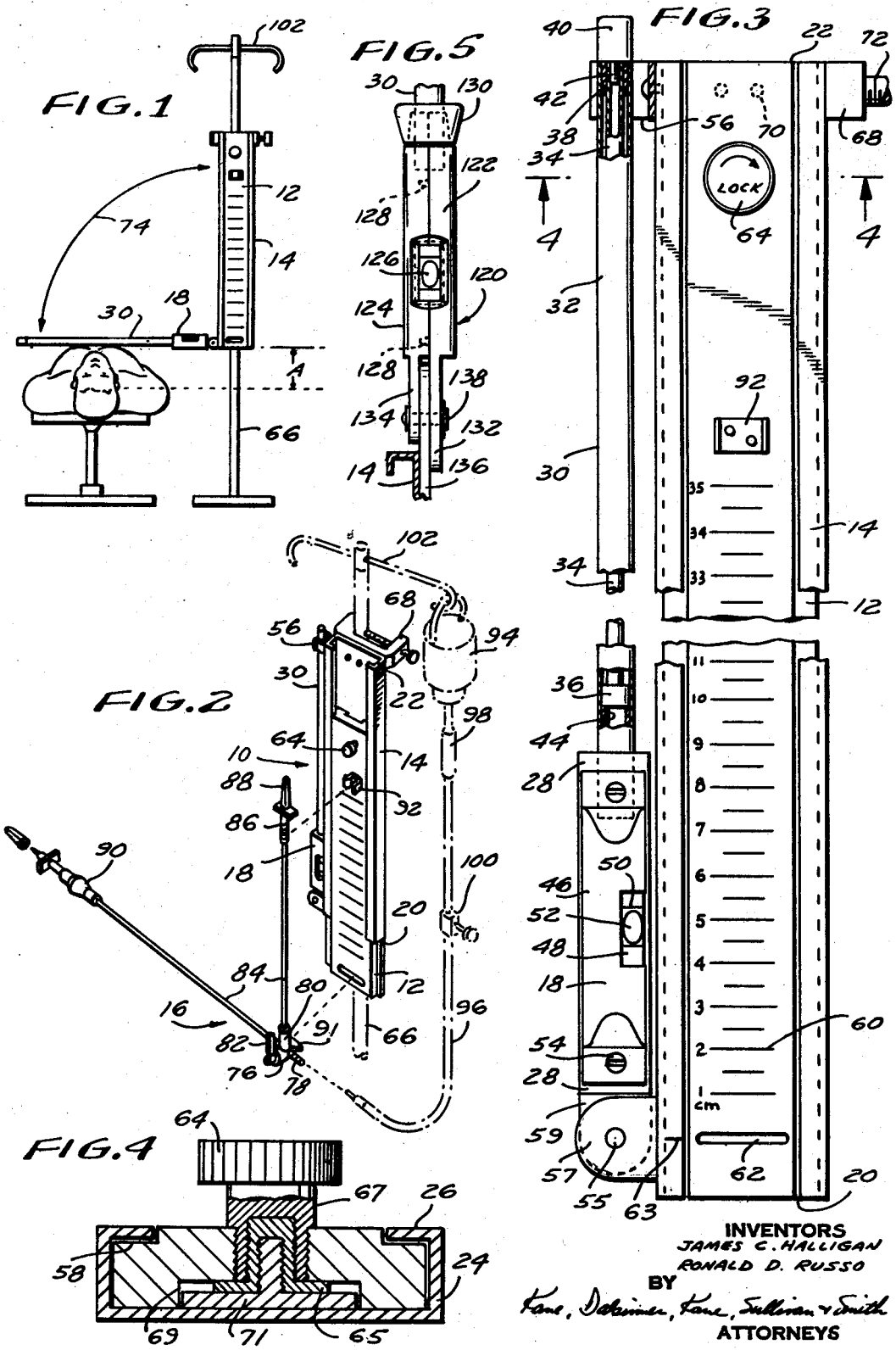

3,495,585
VENOUS PRESSURE MONITORING APPARATUS
James C. Halligan, Radburn, N.J., and Ronald D. Russo, Wethersfield, Conn., assignors to Becton Dickinson and Company, East Rutherford, N.J., a corporation of New Jersey
Filed Nov. 7, 1967, Ser. No. 681,253
Int. Cl. A61b 5/02; A61m 5/00
U.S. Cl. 128—2.05      4 Claims

ABSTRACT OF THE DISCLOSURE

Pressure monitoring apparatus having an adjustable scale member and a manometer set mounted on the scale for reading measured venous pressure. Leveling structure on the scale for precise and positive positioning of the latter in the plane of the right heart atrium thereby to obtain readings based upon a common reference capable of being compared.

BACKGROUND OF THE INVENTION

During many surgical procedures and during post surgical stages it is appropriate to both take and record venous pressure measurements. The upward and downward pressure trends which may be plotted are an important consideration and may appropriately be used as both a diagnostic and prognostic aid. As a specific use, it is known that it is beneficial, with respect to cardiovascular diseases, to obtain pressure readings since an upward pressure trend is one of the first signs of congestive heart failure. Venous pressure monitoring has gained in favor since it provides, generally, a more sensitive index in many applications than can be obtained from an arterial pressure measurement.

Classically venous pressure readings have been obtained through the use of an intravenous needle to provide an arm puncture, a three-way stopcock longitudinally connecting the needle to a syringe, and a graduated tube joined to the remaining or vertical stopcock outlet. Generally, blood is first drawn into the syringe containing a sterile saline or other appropriate solution and, after manipulation of the stopcock valve, the manometer tube is filled by expressing the mixture from the syringe. Thereafter, communication is restored between the manometer tube and vein. The level to which the manometer liquid falls upon reaching equilibrium is read directly from the tube graduation. This is venous pressure.

While this procedure was generally practiced and accepted the use of an intravenous infusion set quickly replaced the syringe, with all else remaining as before.

These systems suffer from disadvantages, one prime disadvantage being the failure to determine and maintain a common reference point from which the venous pressure is read. Thus, the critical accuracy, which is necessary if the results are to be comparative, is lacking. While the parameters of the pressure monitoring apparatus remain constant a parameter which varies is the relative position, with respect to the unit, of the heart atrium. With the tendency toward venous pressure monitoring, either central or peripheral, the common reference is the right atrium of the heart. Thus, irrespective of the time and place of measurement, as long as the patient assumes a lying position, the apparatus is adjusted so that the atrium is the reference. Proper adjustment is important in controlling medication and treatment and proper readjustment is essential if the readings, compared from time to time, are to be meaningful.

Up to the present time adjustment has been carried out by guesstimation since the industry has not developed an apparatus that, with relative ease, may be properly oriented, as discussed and for the function desired.

SUMMARY OF THE INVENTION

The present invention, accordingly, seeks to overcome the disadvantages which are found to exist in present day monitoring apparatus. Thus, in a broad sense the invention is directed to the combination of a scale which is carried by a support structure so as to be relatively movable, a manometer set adapted to be connected to a body part, and a leveling mechanism secured to the support structure thereby to insure that the scale zero reference point lies in the plane locating the body part at which a venous pressure reading is taken. The support is mounted on an I.V. stand and the scale, carrying suitable indicia marking, is adapted to receive the manometer set which is connectable to a conventional intravenous infusion unit thereby, upon proper orientation of the scale, to obtain a venous pressure reading.

In accordance with the foregoing discussion it is a principal object of the invention to provide a pressure apparatus of the type capable of monitoring venous pressure either central or peripheral, and a leveling mechanism so that a scale for recording pressure may be properly and positively positioned and repositioned in an unerring manner in the plane of the right atrium so that results may be obtained for comparative evaluation.

Other objects and advantages of the present invention will become apparent to those skilled in the art as the following description, read in conjunction with the appended drawing, is developed.

BRIEF DESCRIPTION OF THE DRAWING

The attached drawing forms a part of the present invention. By this drawing:

FIGURE 1 is an environmental view generally showing the operation of the monitoring apparatus;

FIGURE 2 is a perspective view of all component parts of the total apparatus;

FIGURE 3 is an elevation view of the scale, its support structure and the leveling means by which the scale may be, as in FIG. 1, properly oriented;

FIG. 4 is a view taken along the line 4—4 of FIG. 3 and showing the scale locking means; and FIG. 5 is a view in elevation showing an alternative method of attaching the spirit bubble to the leveling arm and support.

BRIEF DESCRIPTION OF THE PREFERRED EMBODIMENT

Referring now to the drawing the venous pressure measuring apparatus of the present invention is represented by the numeral 10 in FIG. 2. The apparatus includes a scale 12, a scale supporting member 14, a disposable manometer set 16, and scale leveling means 18.

The scale supporting member 14, as shown in the figures, is generally of an elongated length and may be constructed of any suitable material which displays qualities, such as rigidity and strength, to name a few. Thus, the member may be formed from metal or one of the structural plastics. In the preferred embodiment the member is formed of aluminum, thereby to be of relative reduced weight for ease in manipulation, as will be discussed.

The member 14, from its lower end 20 to its upper end 22, is represented by a uniformly dimensioned U-shaped channel 24 (FIG. 4) having a pair of inwardly disposed flanges 26 at the respective ends of the channel side walls. Thus the member 14 is able to support the scale 12 for a relative longitudinal movement.

Scale leveling means 18 (FIG. 3) forms a part of the venous pressure monitoring apparatus and, if over an extended period comparative results are to be obtained, its function is indispensable. The leveling means includes a swivel bar 28 and a leveling arm 30 having an outer arm element 32 and an inner telescopic arm element 34. The leveling arm may be received for operation and retention within a cylindrical bore in one end of the bar 28, shown in dotted line in FIG. 3.

The leveling arm 30 is capable of extending to approximately twice the length as shown in the figures due to the inner telescopic arm element 34. Obviously, further extension capability may be provided by including yet a second inner telescopically received arm element. As is conventional, structure limiting maximum arm extension is provided. Thus, for example, an annular sleeve or ring 36 surrounds the proximal end of the inner telescopic arm element 34. Similarly, an annular sleeve or ring 38 is received within the open bore and at the distal end of the outer element 32.

Sleeve 36 is immovably disposed on the telescopic element 34 whereas sleeve 38 is only frictionally retained by the bore of outer element 32. The friction developed is such that the inner element may be introduced within the outer element and provides a stationary bearing surface on exeension of the arms. The sleeves may be of a plastic or other suitable material and the fit between arm 32 and sleeve 38 is such that, under normal usage (the telescopic inner element will not disengage from the arm on five pounds of pull), the amount of total extension is determined by an abutting coaction of sleeves 36 and 38. Obviously other equivalent extension limiting structure may be resorted to. For example, the distal end of the outer arm element may be rounded and inwardly pressed. At a point adjacent the end of a plurality of inwardly directed protuberances may be pressed proximal to the same diameter. The inner telescopic arm end may carry a self-tapping screw whose head diameter approximates the normal inner diameter of arm 32. Thus, in telescoping the arm 34 in the extending direction the screw head will coact with the protuberances to limit motion. The protuberances and inwardly pressed end serve as a bearing surface during extension.

Maximum retraction is limited by a tip 40 having a projecting neck 42 of reduced diameter that is frictionally received within the bore of the telescopic arm element 34. Generally the tip is of a diameter equal to the outer diameter of the arm 32 so that its annular shoulder rests, when the inner element is retracted, upon the end cylindrical wall of the arm. Under circumstances such as the tip 40 becoming dislodged a sleeve 44, frictionally received within the proximal end bore of arm 32, defines the retraction limit of the inner arm 34. Similarly, other equivalent retraction limiting structure may be resorted to.

A level device 46 (see FIG. 3), of the conventional bubble type, is carried by the swivel bar 28. Levels of this type are well-known in the art. Generally, therefore, they are defined by a member which supports, within an opening, a liquid containing sealed tube 48 having a pair of indicator lines 50 scribed on the tube surface for indicating, when the movable bubble 52 is disposed therebetween, that the swivel bar 28, in the present instance, is horizontal. In FIG. 3 the level device is detachably received, by screws 54, on the bar 28 or otherwise attached by riveting. In either case the connecting means will suitably provide a rigid connection for the leveling arm 30.

The scale leveling means 18 is suitably mounted on the channel member 14 within the region adjacent its lower end 20. Mounting may be accomplished in many ways. As shown in FIG. 3 a hinge 57, having a slotted central portion (not shown), is positioned with its base in abutting relation to the channel side wall. The hinge is riveted or otherwise immovably fastened to the channel. An end portion 59 of the swivel bar of reduced thickness is received within the hinge slot and connected at 55, for pivotal movement, by a screw or rivet 55. A spring clip 56 is located at the upper end of the channel to retain the leveling arm 30 when not in use. Structure (not shown) may be provided to introduce a slight frictional force at the extremes of its movement (see FIGS. 1 and 3). Introduction of friction when moving the leveling arm to the FIG. 1 position will essentially eliminate the possibility of undue trauma to the patient which might be caused by a free moving arm abruptly striking the chest. The restrained arm movement will also prevent the fracture of plastic parts by abrupt stoppage in movement. Structure to introduce friction, thereby to cause restrained movement of the pivotal extremes, is well-known.

The slide assembly 12 is constructed in a manner so as to be complementary to the channel 14. Thus, in the preferred embodiment it is of equal length (FIG. 2) and, due to the undercut 58 along both sides throughout its total length, is received (FIG. 4) within the channel for relative sliding movement.

A scale 60 which may, as shown, be in centimeters is provided upon the face of slide 12. Scale 60 for the purpose of example only is shown to be thirty-five (35) centimeters in length. Obviously this length may be extended or reduced as choice dictates. The scale may also be in millimeters or in a different measuring system entirely. The overall length and the particular scale will be determined by the design features of the manometer set 16.

A slot adapter 62 (FIG. 3) is located near the lower end of slide 12. The adapter slot is oriented such that its median axis is in the plane of the longitudinal axis of pivotal connecting structure 55 and determines a zero centimeter reference level. An indicia mark 63, since the slot ends are closely adjacent the channel flanges 26, allows relative ease in proper initial positioning of the slide 12. In FIG. 3 the slot 62 is at the zero centimeter level. Actually the slot may be positioned below this level since its positioning, assuming proper scale orientation, is immaterial. Thus, if the zero centimeter line locates the right atrium liquid within the manometer set will seek its own level and rise within the scale tube to the proper level.

A screw 64 is provided at the upper end of slide 12. The screw, best seen in FIG. 4, includes a knurled flanged top for ease in turning and a depending shank which passes through the slide 12. The shank is internally threaded to receive a second member that is threaded both along its outer and inner surface. The member has a flanged base 65 which together with hub 67 secures the screw 64 on the slide. A locking member 71 is disposed within the slide channel 69, thereby to preclude rotary motion, and upon rotation of screw 64 the locking member, received within the second member, moves toward and away from the scale support to locate the scale 12. Other similar lock screw structures may be provided.

Orientation of the apparatus so that venous pressure may be monitored both continuously or intermittently over time periods at varying locations to obtain comparative results for the observation of upward and downward trends as both a diagnostic and prognostic aid is relatively easy yet the apparatus is positioned with precision.

Reference may be had to FIG. 1 which schematically illustrates an orientation sequence. The venous pressure monitoring apparatus 10, less the manometer set 16 to be discussed, is initially attached to an intravenous pole 66. Attachment is by means of a clamp 68 which is riveted or otherwise attached at 70 to the end 22 of channel 14. The level arm 30 is now swung through the arc 74 of substantially 90° so that either the outer arm element 32 or the inner telescopic arm element 34 is capable of resting upon the chest, at the sternum, of the patient. Generally, the arm will be levelled and the slide support lowered to the patient's chest. This may be considered a first coarse adjustment. The level arm may also and if necessary, due to non-vertical stands and uneven floors, be moved through a slightly greater or smaller angle.

Throughout this procedure, the scale 12 is located so that the zero centimeter line is in the plane of the indicia mark 63. This is the zero reference point. Thus, the patient's chest is now in the plane of zero reference.

Assuming that the monitoring to be performed is that of central venous pressure, i.e., pressure within the right atrium of the heart, it will be necessary to locate the scale in accordance with the presumed location of the atrium. Depending upon the physical development of the patient the atrium will generally be located a distance of approximately 5–10 centimeters below the chest surface. Thus, the next adjustment will be in accordance with an educated guess and whatever the adjustment is decided to be it should be recorded so that, during future orientations and measurements, the same distance will be used. Therefore, the zero centimeter line of scale 12 will be located some distance A below the initial zero reference line and indicia mark 63. If this distance be 5 cm., the 5 cm. scale mark is then aligned and at latter times realigned with the indicia mark 63. Screw 64 is tightened for retention of the adjusted orientation. The screw 64 is designed to maintain slide position against a downward pulling force of approximately two pounds.

Thus it is seen that the apparatus structure is such that a zero reference level of a scale for recording either central or peripheral venous pressure may be located and relocated in a positive and unerring manner in the plane of the atrium so that results may be obtained for comparative evaluation.

Continuing now with the discussion, the manometer set 16, which is an integral part of the total apparatus and forms a part of the total combination, is best shown in FIG. 2.

The manometer set 16 includes a three-way stopcock 76 having a pair of female Luer outlets. One outlet is indicated by the numeral 78 while the other is substantially hidden by a male Luer adapter 80. Outlet 78 normally carries a male Luer-Lok cap for convention purposes. This cap (not shown) is removed when the set is connected to an intravenous infusion unit.

A third outlet of the male Luer type is, in FIG. 2, hidden by the stopcock handle 82, connected to the inner stopcock valve (not shown). Each outlet is adapted to connect a length of tubing 84 to the stopcock. The end of one lengh is received by the tapered male Luer and the end of the second length is supported by the adapter 80.

The tubing is preferably translucent or transparent so that fluid movement through its bore may be discerned. In the preferred embodiment the tubing is a vinyl plastic. Such tubing has been found to perform under prescribed preliminary testing, such as a pressure test of 5 p.s.i. (air).

Referring to FIG. 2, the upright tube section, within which fluids either rise or fall to an equilibrium level representative of monitored venous pressure, has at its other end a connector 86 in the form of a male adapter. The adapter 86 may be received within the tube bore. Substantially closing the tube to the atmosphere is a male adapter cover 88. The cover has an end air vent (not shown) and a ball of cotton or other suitable filtering material at the vent to prevent contaminants from entering the manometer system. The other tubing section is likewise provided with a male adapter and adapter cover. Further, and intermediate the tubing and adapter it is convenient to place a flashback bulb 90 which provides the well-known function.

The connections, aside from the taper fit between the male adapters and adapter covers which must withstand a pull test of ½ pound, between tubing and joining structure are cemented and must withstand a pull test of 2 pounds.

The manometer set 16, which is disposable after use, is readily positioned on the movable scale 12. Thus, a stopcock wing 91 that is removably receivable in the slot adapter 62 is provided at the rear of the stockcock 78. The wing is so located that the horizontal axis through the stopcock is received in the plane of the slot adapter and indicia mark 63. The male adapter on the manometer tube is, with slight force, received in a clip 92 adjacent the indicia on the scale face. Clip 92 may be received within a cut-out portion on the face of scale 12 and adhesively retained.

As is now conventional an intravenous infusion set (normal saline or dextrose and water) is connected to the female Luer 78 of stockcock 76 by tubing 96. As is also conventional the tubing connecting an isotonic saline source 94 and the stopcock includes a drip chamber together with a filter 98 and a flow control valve 100. The saline is suitably connected to the intravenous stand 66 by one of its upper arms 102.

A venous pressure reading may now be taken. The fluid flow paths which are sterile and pyrogen free are, by opening control valve 100 and allowing saline to drain therethrough, purged of air. Thereafter, the flow control valve 100 is again closed. A puncture, using either an intravenous catheter or needle, is made with the manometer tube closed to the saline source. After the puncture is made the stopcock handle 82 is approximately turned to close the flow path to the saline. At this point a fluid head will fall within the manometer tube. If the tube is initially free of liquid the liquid will enter and rise to an equilibrium point. If the manometer tube is initially full of liquid the liquid will drop to an equilibrium point. In either case the venous pressure may be read directly from the scale 12 in centimeters of solution.

FIG. 5 shows an alternative or second embodiment of structure by which a spirt bubble is mounted on the scale support member 14 by a levelling member 120. Generally the member includes a bracket defined by a pair of complementary side elements 122 and 124 that are formed with an opening forming a window to view the level bubble element 126, as in FIG. 3.

The side elements are received and retained, as in FIG. 5, by the interaction of lugs and sockets 128, formed in the respective elements, and sleeve 130. Suitably the member 120 may be formed of plastic and the side members may be additionally adhesively coupled.

Prior to coupling the side members, the leveling arm 30 is connected to the leveling member 120 by any suitable means, such as a pin and socket connection, and the sleeve retains the assembled relationship of parts.

As in FIG. 5, each side member is provided with a flanged portion 132 and 134, which cooperate with a flange 136, connected to the scale support 14, to provide, due to the pin or rivet 138, pivotal movement of the levelling member 120 in relation to support 14.

From the foregoing it should be apparent that the objects and advantages of the invention are carried out and that the present invention provides an apparatus of the pressure monitoring type which is capable of monitoring both central and peripheral venous pressure and due to positive orientation of the monitoring structure to obtain readings under conditions wherein the apparatus parameters remain constant for comparative results. While the foregoing discussion is directed to a preferred embodiment of the monitoring structure this has been done for the purpose of illustration and not by way of limitation since the invention and its readily apparent modifications are to be determined and only limited by the scope of the claims appended hereto.

Having now described the invention, we claim:

1. An apparatus adapted for use in measuring and monitoring venous pressure and capable of locating a scale at a common reference venous pressure point so that both increases and decreases in venous pressure may be determined and the readings compared during extended and intermittant periods, said apparatus comprising an elongated scale element having a series of indicia scale markings representative of venous pressure along its longitudinal length and carrying connecting means adjacent the indicia scale ends for mounting along the scale the manometer tube of a manometer set which is adapted to connect an infusion set and a source of saline to a body vein whereby fluid increases or decreases in said manometer tube indicate changes in venous pressure, an elongated support adapted to be adjustably mounted in a generally vertical position on an intravenous pole and having means for retaining said scale thereby to allow motion in substantially one plane, said scale element being received by said support so as to be slidably movable relative thereto, screw means on said scale adapted to interact with said support for immovably positioning said scale with respect to a stationary support reference, and a beam having means for indicating a horizontal attitude of said beam, means mounting said beam on said support for movement to said horizontal position, said mounting means being located so that the axis of the beam is in the plane of the support reference when the beam is horizontal thereby to assure proper adjustment and positioning of the stationary support reference in the plane of a patient's chest so that said scale may be thereafter located at said common reference venous pressure point whereby comparative venous pressure readings are obtained.

2. The apparatus of claim 1 wherein the support is generally in the form of a channel and of substantially the length of said scale, and said means for retaining said scale to preclude all but sliding movement defined by the respective channel edges being inwardly bent so as to be directed toward one another.

3. The apparatus of claim 1 wherein said means indicating beam attitude is a spirit bubble.

4. The apparatus of claim 1 wherein said beam is telescopically extendable.

References Cited

UNITED STATES PATENTS

| | | |
|---|---|---|
| 1,135,941 | 4/1915 | Kopinski. |
| 1,404,425 | 1/1922 | Bartholdy. |
| 2,625,153 | 1/1953 | Baum. |
| 3,413,970 | 12/1968 | Rockwell. |

FOREIGN PATENTS 6702903  10/1967  Netherlands.

ANTON O. OECHSLE, Primary Examiner

P. E. SHAPIRO, Assistant Examiner

U.S. Cl. X.R.

128—214